(12) United States Patent
Wilke et al.

(10) Patent No.: US 11,483,130 B2
(45) Date of Patent: Oct. 25, 2022

(54) BIDIRECTIONALLY LINKED EXTENDED BLOCKCHAIN STRUCTURE

(71) Applicant: BUNDESDRUCKEREI GMBH, Berlin (DE)

(72) Inventors: Andreas Wilke, Berlin (DE); Ilya Komarov, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 236 days.

(21) Appl. No.: 16/648,479

(22) PCT Filed: Aug. 27, 2018

(86) PCT No.: PCT/EP2018/072989
§ 371 (c)(1),
(2) Date: Mar. 18, 2020

(87) PCT Pub. No.: WO2019/057444
PCT Pub. Date: Mar. 28, 2019

(65) Prior Publication Data
US 2020/0235913 A1     Jul. 23, 2020

(30) Foreign Application Priority Data
Sep. 22, 2017     (DE) ..................... 10 2017 216 839.0

(51) Int. Cl.
*G06F 21/64*     (2013.01)
*H04L 9/06*     (2006.01)
(Continued)

(52) U.S. Cl.
CPC .......... *H04L 9/0637* (2013.01); *G06F 21/602* (2013.01); *G06F 21/64* (2013.01);
(Continued)

(58) Field of Classification Search
CPC ....................................................... G06F 21/64
See application file for complete search history.

(56) References Cited

U.S. PATENT DOCUMENTS 9,608,829 B2    3/2017   Spanos et al.
9,979,718 B2    5/2018   Kurian
(Continued)

FOREIGN PATENT DOCUMENTS

WO     2016161073     10/2016

OTHER PUBLICATIONS

Garay et al. "The Bitcoin Backbone Protocol: Analysis and Applications" International Association for Cryptologic Research, Mar. 7, 2017, vol. 20170307, pp. 1-43.
(Continued)

*Primary Examiner* — David J Pearson
(74) *Attorney, Agent, or Firm* — K&L Gates LLP

(57) ABSTRACT

The invention relates to a method for the tamper-proof storage of data in an electronic store using a bidirectionally linked blockchain structure. The method comprises the steps of:
providing a first family of functions, which comprises a plurality of functions, wherein the functions differ by at least one first parameter and are uniquely identifiable using the first parameter of each;
generating an additional block to extend the blockchain structure which comprises the data to be stored;
creating a first block-dependent bidirectional linking function for bidirectional linking of the last block to the additional block.

20 Claims, 8 Drawing Sheets

(51) Int. Cl.
*G06F 21/60* (2013.01)
*G06Q 10/10* (2012.01)
*H04L 9/00* (2022.01)

(52) U.S. Cl.
CPC ........... *G06Q 10/10* (2013.01); *H04L 9/0643* (2013.01); *G06Q 2220/00* (2013.01); *H04L 9/50* (2022.05)

(56) References Cited

U.S. PATENT DOCUMENTS

| | | |
|---|---|---|
| 10,192,073 B2 | 1/2019 | Marin |
| 10,805,067 B1 | 10/2020 | Griffin et al. |
| 2016/0028552 A1 | 1/2016 | Spanos et al. |
| 2016/0261690 A1 | 9/2016 | Ford |
| 2017/0070890 A1 | 3/2017 | Luff et al. |
| 2017/0116136 A1 | 4/2017 | Macnicol et al. |
| 2017/0346639 A1 | 11/2017 | Muftic |
| 2017/0352219 A1* | 12/2017 | Spanos ............... H04L 9/3239 |
| 2017/0366353 A1 | 12/2017 | Struttman |
| 2018/0219669 A1 | 8/2018 | Chen et al. |
| 2018/0367518 A1* | 12/2018 | Singh ............... H04L 63/10 |
| 2019/0073646 A1 | 3/2019 | Wright et al. |
| 2019/0103975 A1 | 4/2019 | Jacobs et al. |
| 2019/0122186 A1* | 4/2019 | Kano ............... G06Q 20/3829 |
| 2020/0057869 A1 | 2/2020 | Wilke et al. |
| 2020/0118068 A1 | 4/2020 | Turetsky et al. |
| 2020/0235913 A1 | 4/2020 | Wilke et al. |
| 2020/0259634 A1 | 8/2020 | Wilke et al. |
| 2020/0287707 A1 | 9/2020 | Wilke et al. |
| 2020/0344043 A1 | 10/2020 | Komarov et al. |
| 2021/0352134 A1 | 11/2021 | Bjontegard |

OTHER PUBLICATIONS

Arvind et al. "Bitcoin and Cryptocurrency Technology—Sections: 1.2, 2.4, 3.4, 3.5" Feb. 9, 2016, retrieved from the Internet: https://web.archive.org/web/20170602075829/https://d28rh4a8wq0iu5.cloudfront.net/bitcointech/readings/princeton_bitcoin_book.pdf.
"Block Chain", viewed Mar. 27, 2020, https://en.wikipedia.org/wiki/Block chain.
"Mastering Bitcoin", Chapter 7, The Blockchain, p. 161. 2014.
Nakamoto, "Bitcoin: Peer-to-Peer Electronic Cash System", 2008, (https://bitcoin.ora/bitcoin.Pdfl, Pa. 1-9.
A. Narayanan et al., 'Bitcoin and Cryptocurrency Technologies' Sections 1.2, 2.4, 3.4, and 3.5, retrieved on the internet at https://web.archive.org/web/20170602075829/https://d28rh4a8wq0iu5.cloudfront.net/bitcointech/readings/princeton_bitcoin_book.pdf, Feb. 2016.
Y. Sompolinsky et al., 'SPECTRE: Serialization of Proof-of-work Events: Confirming Transactions via Recursive Elections' retrieved on the internet athttps://web.archive.ora/web/2017071015 2154/ https://eprint.iacr.ora/2016/1159, Jul. 2017.

\* cited by examiner

BIDIRECTIONALLY LINKED EXTENDED BLOCKCHAIN STRUCTURE

CROSS REFERENCE TO RELATED APPLICATIONS

The present application is a National Stage of International Application No. PCT/EP2018/072989, filed on Aug. 27, 2018, which claims priority to German Patent Application No. 10 2017 216 839.0, filed on Sep. 22, 2017, the entire contents of which are being incorporated herein by reference.

The invention relates to a method and an electronic data storage system for the storage of data. In particular, the invention relates to a method and an electronic data storage system for the tamper-proof storage of data in a bidirectionally linked blockchain structure.

The possibility to change or even deliberately manipulate digitally coded data in electronic stores poses a technical challenge.

Blockchain structures for securing data are known from the prior art. These blockchain structures are unidirectionally linked blockchain structures. For example, corresponding blockchain structures are used in order to log transactions of cryptocurrencies, such as the Bitcoin payment system.

A blockchain structure in this case provides an extendible list of data records, which are arranged in blocks. The integrity of the individual blocks is secured in the prior art by a unidirectional linking using cryptographic check values of the individual blocks in the form of hash values. The blocks are linked on account of the fact that each block comprises a cryptographic check value of the previous block inclusive of the cryptographic check value stored in the previous block. In this case each block comprises a check value which is based on the content of all previous blocks. It is therefore difficult to manipulate such a blockchain at a later moment in time, since, in order to do this, not only would an individual block have to be manipulated, but also all subsequent blocks, because the check value of each subsequent block is based, amongst other things, on the block that is to be manipulated. If the block that is to be manipulated is then actually manipulated, its check value thus changes. This altered check value then no longer matches the check values of the subsequent blocks, and therefore the manipulation is identifiable and will be apparent if a check by means of the check values is performed.

Known blockchain structures, however, implement merely a unidirectional linking and thus safeguarding of the data, since only data contents of previous blocks are taken into consideration in the linking. On the basis of the linking, it is thus possible to check whether a previous block of a provided blockchain structure has been manipulated. However, it is not possible to check whether the provided blockchain structure is complete. In particular, it is not possible to check whether part of the blockchain structure might have been cut off. Furthermore, it is not possible to check whether the last block has been manipulated.

When checking and safeguarding blockchain structures, conventional hash methods are also used. Individual blocks of the blockchain structure are linked unidirectionally to one another via hash values. So that such a blockchain structure comprising blocks linked to one another unidirectionally may be checked for manipulation, all of the information of the individual blocks as well as the hash value of each of the blocks are required. Furthermore, when checking such a blockchain structure it is necessary to start with the first block of the corresponding blockchain structure and to end with the last bock.

The object of the invention is to create an improved method for the tamper-proof storage of data.

The object forming the basis of the invention is solved by the features of each of the independent claims. Embodiments of the invention are described in the dependent claims.

Embodiments include a method for the tamper-proof storage of data in an electronic store using a bidirectionally linked blockchain structure, wherein the method comprises the steps of:
  providing the bidirectionally linked blockchain structure;
  providing the data to be stored;
  providing a first family of functions, which comprises a plurality of functions, wherein the functions differ by at least one first parameter and are uniquely identifiable using the first parameter of each;
  generating an additional block to extend the blockchain structure, which block comprises the data to be stored and is intended to be bidirectionally linked to the last block of the blockchain structure, the last block of the blockchain structure comprising stored data;
  creating a first block-dependent bidirectional linking function for bidirectionally linking the last block to the additional block, the creation of the first linking function comprising the steps of:
    calculating at least one first check value for the last and the additional blocks using the data stored in the last block and the data to be stored in the additional block;
    selecting a first function from the first family of functions depending on the first check value in accordance with a first unique assignment condition between the first parameter of the selected first function and the first check value;
    using the selected first function for creating the first block-dependent bidirectional linking function;
  bidirectionally linking the last block to the additional block, the bidirectional linking comprising the steps of:
    adding the first block-dependent bidirectional linking function to the last block;
    adding the first block-dependent bidirectional linking function to the additional block;
  storing the blockchain structure extended by the additional block.

Embodiments may have the advantage that they make it possible to provide a bidirectionally linked blockchain structure in which the blocks are linked to one another by means of block-dependent bidirectional linking functions. The linking in this case enables a bidirectional checking of the blockchain structure for authenticity and/or manipulation. In this case, the blockchain structure may be checked not only in one direction, but in two directions.

A "blockchain structure" is understood to mean a data structure which forms a blockchain. A "blockchain" is understood to mean an ordered data structure which comprises a plurality of data blocks linked to one another. In particular, a blockchain is understood to mean a database whose integrity, i.e. protection against subsequent manipulation, is safeguarded by storing a check value, such as a hash value, of each previous data record in the subsequent data record. In this case the check value is assigned to the content of the previous data record and characterises it uniquely. If the content of the previous data record is changed, it no longer satisfies the inspection feature, and therefore the change is evident. In the case of known blockchain structures, for example each block of the blockchain is clearly identified by a hash value and references a predecessor block in the blockchain whose hash value it comprises.

See https://en.wikipedia.org/wiki/Block_chain_(database) and "Mastering Bitcoin", Chapter 7, The Blockchain, page 161 ff. for examples of a blockchain. The concept of the blockchains was described for example in 2008 in a White Paper under the pseudonym Satoshi Nakamoto in the context of the Bitcoin cryptocurrency ("Bitcoin: Peer-to-Peer Electronic Cash System" (https://bitcoin.orgibitcoin.pdf)). In this example, each block of the blockchain contains, in its header, the hash of the entire previous block header. The order of the blocks is thus uniquely defined, resulting in a chain structure. Due to the linking, thus implemented, of the individual blocks to one another, a subsequent modification of preceding blocks is not possible without also modifying all subsequent blocks.

The protection of a blockchain structure may be increased for example in that it is published or generally accessible, and therefore a comparison of an available copy of the blockchain structure with further published or accessible copies of the same blockchain structure is made possible.

A check value for data is a value assigned to the corresponding data, which value uniquely characterises the data in such a way that the integrity of the data may be checked on the basis of the check value. For example, the check value is calculated from the corresponding data. A check value in the form of a checksum for example provides a value that has been calculated from the corresponding data as starting data and is configured to identify at least a bit error in the data. Depending on the complexity of the calculation method for the checksum, more than one error may be identified or also corrected. Known check values or checksums may be based for example on a summing of data values, a calculation of a digit sum, a parity bit, a weighted mean value of the data, or on more complex calculation methods, such as a cyclic redundancy check or the use of a hash function.

A check value may be calculated for one or more blocks of a blockchain structure, Such a check value will also be referred to hereinafter as a block-dependent check value. For example, the check value is calculated from the data that are stored or are to be stored in a block. For example, a check value is calculated for each two successive blocks of the blockchain structure, and the two resultant check values are used to calculate a common combined check value. For example, the data that are stored or are to be stored in the two successive blocks are combined with one another, and a common check value is calculated from the combined data. For example, the data or check values are combined with one another using an arithmetic operation, such as addition, subtraction, multiplication and/or division.

A block-dependent linking function denotes a function that comprises at least one variable and is dependent on at least one block-dependent check value. For example, the block-dependent linking function comprises the block-dependent check value as parameter. A block-dependent bidirectional linking function denotes a function that comprises at least one variable and is dependent on the check values of two successive blocks. For example, a check value is calculated for each of the two blocks, and the block-dependent bidirectional linking function is dependent on the two check values. For example, it comprises both check values as parameter. For example, a check value is calculated for each of the two blocks, and the two resultant check values are combined to form a common check value, on which the block-dependent bidirectional linking function is dependent. For example, the block-dependent bidirectional linking function comprises the common check value as parameter. For example, the data or user data comprised by the two blocks are combined with one another, and a common check value is calculated from the combined data. In this case, the block-dependent bidirectional linking function is dependent for example on the common check value. For example, it comprises the common check value as parameter.

In the case of a unidirectionally linked blockchain structure, a check value is calculated using a block of the blockchain structure and is added to an additional block that is to be unidirectionally linked to the first-mentioned block. This addition creates a unidirectional linking. On the basis of the added check value, the integrity of the block or the data of the block to which the additional block is unidirectionally linked may be checked. To do this, for example the check value is recalculated using the data of the block to be examined and is compared with the added check value. If both check values match, the integrity of the block or the data of the corresponding block to which the additional block is unidirectionally linked is safeguarded. This linking is unidirectional since a checking of data is enabled only in one direction: The integrity of the previous block may be checked on the basis of the check value added to the additional block. However, the integrity of the subsequent block, i.e. of the additional block, may not be checked on the basis of just any information comprised by the previous block.

In the case of the bidirectionally linked blockchain structure, a block-dependent bidirectional linking function is calculated in accordance with embodiments. This block-dependent bidirectional linking function is dependent both on the data of both blocks bidirectionally linked to one another. For example, the block-dependent bidirectional linking function is added to each of the two blocks. The integrity of both blocks or the data of both blocks may thus be checked on the basis of the block-dependent bidirectional linking function. To do this, the block-dependent bidirectional linking function is recalculated, for example using the data of both blocks, and is compared with the block-dependent bidirectional linking function added to one of the two blocks. If the calculated and the provided block-dependent bidirectional linking functions match, the integrity of both blocks or the data of both blocks is safeguarded. The starting point of the check may be both blocks in this case, since both blocks each comprise the block-dependent bidirectional linking function. It is thus possible to check the data in both directions: The integrity of the previous block may be checked on the basis of the block-dependent bidirectional linking function added to the additional block. The integrity of the subsequent block, i.e. of the additional block, may also be checked on the basis of the block-dependent bidirectional linking function comprised by the previous block.

If a bidirectional linking function is thus added both to the additional block and to the block to which the additional block is bidirectionally linked, an integrity check may thus be performed also on the basis of the bidirectional linking function added to the corresponding block of the blockchain structure. In other words, with a bidirectional linking of two blocks, an integrity check may be performed both starting from the bidirectional linking function stored in a first of the two blocks and starting from the bidirectional linking function stored in the second of the two blocks.

An additional consistency check may consist, for example, of checking whether both blocks bidirectionally linked to one another comprise the same block-dependent bidirectional linking function.

On the basis of a block-dependent bidirectional linking function, in contrast to known, unidirectionally linked blockchain structures, it may also be identified for example whether the blockchain structure has been cut. Since the check values in the case of known, unidirectionally linked blockchain structures each only comprise information regarding previous blocks, it is not possible to determine, on the basis of such a check value, whether subsequent blocks exist. Thus, it also may not be identified if subsequent blocks are changed, replaced or removed during the course of a manipulation. By contrast, a block-dependent bidirectional chaining function according to embodiments comprises information regarding both blocks linked to one another. The linking function is also added to each of the two corresponding blocks. If an added block is changed, replaced or removed during the course of a manipulation, this may thus be identified on the basis of the block-dependent bidirectional linking function of the previous block to which the added block is bidirectionally linked.

A family of functions denotes a multiplicity of functions which differ by at least one parameter. The functions may be uni- or multi-dimensional functions, i.e. the functions may comprise one or more variables. For example, the functions differ by one parameter. For example, the functions differ by n parameters, and the n parameters form an n-tuple. For example, n=2, i.e. the functions differ by two parameters.

Functions of the family of functions are identifiable on the basis of the parameters by which they differ uniquely. The functions of the family of functions are, for example, elements of a function space and may be described by a functional, i.e. a function on functions.

A parameter denotes a function-individual constant, i.e. a value that may vary from function to function of the family of functions, but for a specific function is always fixed or constant. For example, a parameter may be, for example, a summand, minuend, subtrahend, factor, dividend, divisor or exponent.

With regard to the assignment condition, the ratio between check value(s) and parameter(s) describes the selected function. For example, one or more check values are calculated and a parameter is determined for each of the check values by the assignment condition. The function of a family of functions which comprises the corresponding parameters or is identified by the corresponding parameters is selected in order to create the first block-dependent bidirectional linking function.

For example, the assignment condition may be an identity. This means that the function which comprises the calculated check values as parameter is selected. The assignment condition may also be given by a linear function or a non-linear function, such as a polynomial. For example, an offset may be introduced by a linear function, in order to prevent parameter values smaller than the corresponding offset from being used. For example, it may thus be ensured that the selected functions have a minimum level of complexity.

It is known from the prior art how a number, i.e. a check value, may be generated from any data or information with the aid of special functions, such as hash functions. Some embodiments may have the advantage that analytical functions, instead of numbers, are generated from the data or information. To this end, the numbers are used for example as an intermediate result, but a linking function is provided at the end. Some embodiments may thus have the advantage to generate an analytical function from digitalised information depending on the starting information. To this end, a number, a pair of numbers, or an n-tuple of numbers or check values is first generated from the information. In the next step, this number (these numbers) or check values is (are) used to determine one or more parameters of a function. In this case, functions with which, in a next step, functionalisations may be realised by analytical operations are generated from data or information. For example, the functions are used as linking functions of data blocks which may be used to check and to prove the integrity of the corresponding data blocks. Unique analytical functions may thus be generated from any digitalised information via parameters and may be used as check functions.

In accordance with some embodiments the use of the selected first function to create the first block-dependent bidirectional linking function comprises a use of the selected function as first block-dependent bidirectional linking function. In accordance with some embodiments the selected function is thus identical to the first block-dependent bidirectional linking function. Some embodiments may have the advantage that, by use of the selection function as first block-dependent bidirectional linking function, an effective bidirectional linking of the blocks may be implemented. With use of the block-dependent bidirectional linking function, the integrity of the data of the blocks on whose values or check values the linking function is dependent may be checked effectively.

In accordance with some embodiments the first check value is a combined check value which is dependent both on the data stored in the last block and on the data to be stored in the additional block. For example, the data are combined with one another and the check value calculated using the combined data. In accordance with an alternative embodiment, a check value is calculated for each of the blocks and the two resultant check values are combined to form the combined check value. Some embodiments may have the advantage that the information regarding the content of the data of two blocks may be combined in a single function.

In accordance with some embodiments the data are stored in the blocks of the blockchain structure in a square matrix structure, where T is a natural number greater than or equal to two and the calculation of the first check value comprises the steps of:
  calculating a sum over each column of a first matrix structure which is provided by the two matrix structures of the data stored in the last block and the data to be stored in the additional block;
  calculating a sum over each row of a second matrix structure which is provided by the two matrix structured of the data stored in the last block and the data to be stored in the additional block;
  calculating the combined sum from the sum of the i-th column and the sum of the i-th row, where i is a natural number and runs from 1 to T;
  forming the first block-dependent check value by linking the combined sums to one another.

Some embodiments may have the advantage that, by different summation rules for the two blocks to be linked to one another, for example on the one hand a summation over the individual columns and on the other hand a summation over the individual rows, the resultant combined check value comprises not only information regarding the data of the blocks to be linked to one another, but also information regarding their order. If the order of the two blocks is swapped, for example there is no column-based summation for the formerly previous block, but instead a row-based summation, whereas a column-based summation instead of a row-based summation is provided for the formerly subsequent, but now previous block.

In accordance with some embodiments the blocks to be linked to one another may also comprise matrix structures of different size. For example, the data of one block are stored in a (V×W) matrix structure, whereas the data of the other block are stored in a (X×Y) matrix structure, with V, W, X and Y being natural numbers greater than or equal to two. In this case, for the forming of the combined check value, it may be determined which of the numbers V, W, X or Y is greatest, the number of rows V or X or the number of columns W or Y. If the row and column numbers are identical, there is no need for any additional method steps. If the number of the columns and/or rows are different for the two matrix structures, the matrix structures are each extended by so many rows and/or columns that all column and row numbers are identical to the previously determined greatest number. In this case, all supplemented matrix elements are assigned a defined placeholder value, for example the value 0. As a result, two square matrix structures of identical size are obtained, to which the aforementioned method for square (T×T) matrix structures may be applied.

In accordance with some embodiments, the linking of the combined sums with one another comprises a stringing together of the combined sums. Some embodiments may have the advantage that they provide a simple and clear method for forming the combined check value.

In accordance with some embodiments the functions of the first family of functions differ by a multiplicity of n parameters and are uniquely identifiable using the corresponding n parameters, which form an n-tuple of parameters, the n-tuple of parameters each comprising the first parameter,
the creation of the first block-dependent bidirectional linking function also comprising the steps of:
calculating an n-tuple of first check values for the last and the additional blocks using the data stored in the last block and the data to be stored in the additional block, the n-tuple comprising the first check value;
selecting the first function of the first family of functions depending on the n-tuple of check values in accordance with a first unique assignment condition between the n-tuple of parameters of the selected first function and the n-tuple of check values.

An n-tuple $(x_1, \ldots, x_n)$ denotes an amalgamation of n mathematical objects, here for example check values or parameters, in a list. In this case, the mathematical objects do not necessarily have to be different from one another, and their order is crucial.

In other words, two n-tuples which comprise the same mathematical objects are different from one another if the order of the objects is different. The object $x_i$ situated at the i-th position in this case means the i-th component of the tuple.

Some embodiments may have the advantage that, for example, a check value is calculated for each of the two blocks that are to be linked to one another. For example, the n-tuple may be a 2-tuple, i.e. an ordered pair which consists of the two check values. Some embodiments may also have the advantage that a plurality of check values may be calculated per block, for example n/2 check values. For example, check values may thus be calculated for certain partial regions of the blocks. This may have the advantage, for example, that individual partial regions may be protected by an independent check value. Furthermore, the assignment of individual check parameters to individual partial regions may already increase the complexity of the generation of the first block-dependent bidirectional linking function and thus the security.

In accordance with some embodiments the method also comprises:
providing a second family of functions, which comprises a plurality of functions, wherein the functions differ by at least one second parameter and are uniquely identifiable using the second parameter of each;
the creation of the first block-dependent bidirectional linking function also comprising the steps of:
calculating a second check value using the data to be stored in the additional block, the first check value being calculated using the data stored in the last block;
selecting a second function from the second family of functions depending on the second check value in accordance with a second unique assignment condition between the second parameter of the selected second function and the second check value;
using the selected second function to create the first block-dependent bidirectional linking function, the first block-dependent bidirectional linking function comprising a unique combination of the first and second selected function.

Some embodiments may have the advantage that an individual block-dependent function, i.e. the first and second selected function, are determined for each of the two blocks that are to be linked bidirectionally to one another, i.e. the additional block and the last block of the blockchain structure. Each of these two functions in its own right enables a unilateral linking. The combination of the two functions gives the block-dependent bidirectional linking function which implements a bidirectional linking when stored in the two blocks. For example, the combination may be constituted by linkages such as arithmetic operations. Such arithmetic operations may comprise addition, subtraction, multiplication and/or division, for example.

In accordance with some embodiments the first assignment condition and/or the second assignment condition each comprise a linear function. Some embodiments may have the advantage that, by a linear assignment condition, for example of the form $P_{1/2}=m \cdot PW_{1/2}+t$, where $P_{1/2}$ denotes the first/second parameter, $PW_{1/2}$ denotes the first/second check value, m denotes a gradient and t denotes a minimum value, it may be ensured that the first and/or second parameter are always greater than or equal to a minimum value. For example, it may thus be ensured that the selected first and/or second function has a specific minimum complexity. Furthermore, the distance between the first and/or second parameter relative to the distance between the underlying first and/or second check values may be increased by a linear assignment condition. It may thus be ensured that the resultant first and/or second functions clearly differ from one another for different underlying check values.

In accordance with some embodiments the first assignment condition and/or the second assignment condition comprises an identity. Some embodiments may have the advantage that the first and/or second check value is incorporated into the first and/or second function as a first and/or second parameter.

In accordance with some embodiments the functions of the first family of functions and/or the functions of the second family of functions each comprise a polynomial, with the first parameter and/or the second parameter being the degree of the polynomial. Some embodiments may have the advantage that an efficient and effective method for determining the first and/or second function is provided.

In accordance with some embodiments the polynomials comprised by the functions of the first family of functions and/or the functions of the second family of functions are Hermite polynomials, Legendre polynomials, Laguerre polynomials, Chebyshev polynomials or discrete Fourier transform polynomials. Some embodiments may have the advantage that an efficient and effective method for determining the first and/or second function is provided.

For example, the polynomials are Hermite polynomials $H_n(x)$ of form $$H_n(x) = \sum_{k=0}^{\lfloor n/2 \rfloor} \frac{(-1)^k n!}{(n-2k)! k!} (2x)^{n-2k},$$

wherein the check value is used as parameter n or a linear function of the check value is used as parameter n. For example, the Legendre polynomials $P_n(x)$ are those of form $$P_n(x) = \sum_{k=0}^{\lfloor n/2 \rfloor} (-1)^k \frac{(2n-2k)!}{(n-k)!(n-2k),!k!2^n} x^{n-2k},$$

wherein the check value is used as parameter n or a linear function of the check value is used as parameter n. For example, the polynomials are Laguerre polynomials $L_n(x)$ of form $$L_n(x) = \sum_{k=0}^{\infty} (-1)^k \binom{n}{k} \frac{n!}{k!} (x)^k,$$

wherein the check value is used as parameter n or a linear function of the check value is used as parameter n. For example, the polynomials are Chebyshev polynomials such as Chebyshev polynomials $T_n(x)$ of a first kind of form $$T_n(x) = \frac{\left(x+\sqrt{x^2-1}\right)^n + \left(x-\sqrt{x^2-1}\right)^n}{2}$$

or Chebyshev polynomials $U_n(x)$ of a second kind of form $$U_n(x) = \begin{cases} \frac{\sin((n+1)\arccos x)}{\sqrt{1-x^2}} & \text{for } |x|<1 \\ \frac{\sinh((n+1)\operatorname{arccos} x)}{\sqrt{x^2-1}} & \text{for } |x|>1 \end{cases},$$

wherein the check value is used as parameter n or a linear function of the check value is used as parameter n. For example, the polynomials are discrete Fourier transform polynomials $g(x)$ of form $g(x)=\sum_{k=-n}^{n} c_k e^{ikx}$, wherein the check value is used as parameter n or a linear function of the check value is used as parameter n. For example, the real part Re $[(x)]$, the imaginary part Im $[g(x)]$, or the value $|g(x)|$ is used.

In accordance with some embodiments the functions of the first family of functions and/or the functions of the second family of functions each comprise a spherical harmonic, the first parameter and/or the second parameter being an index of the spherical harmonic. Some embodiments may have the advantage that an efficient and effective method for determining the first and/or second function is provided. For example, the spherical harmonics $Y_{lm}(\vartheta,\varphi)$ are those of form $$Y_{lm}(\vartheta,\ \varphi) = \frac{1}{\sqrt{2\pi}} N_{lm} P_{lM}$$

$$(\cos\vartheta)e^{im\varphi} \text{ with } N_{lm} = \sqrt{\frac{2l+1}{2} \cdot \frac{(l-m)!}{(l+m)!}} \text{ and}$$

$$P_{lm}(x) = \frac{(-1)}{2^l l!}(1-x^2)^{\frac{m}{2}} \frac{d^{l+m}}{dx^{l+m}}(x^2-1)^l,$$

wherein the check value is used as parameter I or a linear function of the check value is used as parameter I. For example, the real part Re $[Y_{lm}(\vartheta,\varphi)]$, the imaginary part Im $[Y_{lm}(\vartheta,\varphi)]$, or the value $|Y_{lm}(\vartheta,\varphi)|$ is used.

In accordance with some embodiments the functions of the first family of functions and/or the functions of the second family of functions each comprise a Gaussian function, the first parameter and/or the second parameter being the width of the Gaussian function. Some embodiments may have the advantage that an efficient and effective method for determining the first and/or second function is provided.

For example, the Gaussian functions are those of form $G_n(x)=e^{1/2n(x-a)^2}$, wherein the check value is used as width or parameter n or a linear function of the check value is used as parameter n.

In accordance with some embodiments the last block of the blockchain structure also comprises a second block-dependent bidirectional linking function of the bidirectional linking of the last block to a penultimate block of the blockchain structure. The addition of the first block-dependent bidirectional linking function to the last block comprises a linkage of the first linking function to the second linking function. For example, a combination of the first linking function and the second linking function is formed. For example, the combination may be constituted by linkages such as arithmetic operations. Such arithmetic operations may comprise addition, subtraction, multiplication and/or division, for example.

In accordance with some embodiments the calculation of the first and/or second check value comprises an application of a hash function to the data stored in the last block and/or the data to be stored in the additional block. Some embodiments may have the advantage that an efficient and effective method for calculating the first and/or second check value is provided.

In accordance with some embodiments, successive blocks of the bidirectionally linked blockchain structure are each linked bidirectionally to one another, wherein two blocks bidirectionally linked to one another each comprise a common block-dependent bidirectional linking function, the common block-dependent bidirectional linking function being dependent in each case on the data stored in both blocks bidirectionally linked to one another.

In accordance with some embodiments the method also comprises a creation of a shortened copy of the bidirectionally linked blockchain structure, wherein the shortened blockchain structure is shorter than the blockchain structure by at least one inner chain segment, the inner chain segment comprising at least one block, with two remaining direct neighbour blocks of the shortened blockchain structure, between which the inner chain segment was removed, being linked to a combined bidirectional linking function which comprises a combination of all block-dependent bidirectional linking functions of the blocks of the removed inner chain segment.

In accordance with some embodiments the removed inner chain segment comprises a plurality of blocks of the bidirectionally linked blockchain structure.

Some embodiments may have the advantage that storage space for example may be stored by shortening the blockchain structure. Some embodiments may also have the advantage that, by the shortening of the blockchain structure, for example blocks with security-sensitive data may be removed, in order to protect them against unauthorised attacks. The use of the combined bidirectional linking function makes it possible to check the removed blocks later for their authenticity or integrity. If removed blocks are made available later or in addition, it may thus be checked on the basis of the combined bidirectional linking function whether these blocks are, in fact, actually the removed blocks. The blockchain structure to which the removed blocks belong may also be determined from the combined bidirectional linking function. The combined bidirectional linking function thus constitutes a type of fingerprint. Such possibilities may be advantageous in particular if the data stored in the blocks of the blockchain structure are encrypted.

Some embodiments may thus have the advantage that the blockchain structure may be shortened without the block-dependent information regarding the linkages of the removed blocks being lost. The combination of the block-dependent linking functions of the blocks of the inner linking segment for example may be constituted by linkages such as arithmetic operations. Such arithmetic operations may comprise addition, subtraction, multiplication and/or division, for example. The block-dependent linking functions are each dependent on data contents of the blocks which they link, or data contents which are uniquely assigned to these blocks. As a combination of all block-dependent linking functions of the blocks of the inner chain segment, the combined bidirectional linking function which links the two blocks remaining after the removal of the inner chain segment without direct linking to one another thus comprises information regarding all data contents of all blocks of the inner chain segment removed between the corresponding blocks.

In accordance with some embodiments the method also comprises:
providing the removed inner chain segment;
checking the authenticity and/or completeness of the provided inner chain segment, the check comprising a comparison of the combined bidirectional linking function of the two remaining direct neighbour blocks of the shortened blockchain structure with a combination of all block-dependent bidirectional linking functions of the blocks of the provided inner chain segment.

Some embodiments may have the advantage that the possibility of removing security-critical information from the blockchain structure is created, whereas the remaining shortened blockchain structure at the same time still remains checkable.

In accordance with some embodiments, in the event of a successful checking of the authenticity and/or completeness of the provided inner chain segment, the shortened blockchain structure is supplemented by the provided inner chain segment, and the combined bidirectional linking function between the two remaining direct neighbour blocks of the shortened blockchain structure is replaced by the original block-dependent bidirectional linking functions of the two blocks neighbouring the removed inner chain segment.

Some embodiments may have the advantage that an efficient method for reproducing the complete blockchain structure from a shortened blockchain structure is provided. In accordance with some embodiments, just one or several shortened portions of the blockchain structure may also be supplemented selectively.

In accordance with some embodiments the data to be stored comprise data which are characterising for the content of a digitally coded document, wherein the provision of the data to be stored comprises a receipt of the data by means of a communications interface via a network from a computer system creating the digitally coded document, the method also comprising the steps of:
receiving a query for a current version of the blockchain structure by means of the communications interface via the network from a querying computer system;
sending the extended blockchain structure by means of the communications interface via the network to the querying computer system in response to the received query.

Some embodiments may have the advantage that the integrity of a digitally coded document may be checked on the basis of the data entered in the blockchain structure. Data which are characterising for the content of this document may be calculated for a provided, digitally coded document. For example, a hash value of the content of the digitally coded document may be calculated. These data may be compared with the blockchain structure: If the blockchain structure comprises the corresponding data, the integrity of the digitally coded document is confirmed and this is recognised as authentic. If the blockchain structure does not comprise the corresponding data, the integrity of the digitally coded document is denied. The blockchain structure in this case may offer the advantage that its size may be kept compact if it only comprises hash values of the digitally coded documents. Furthermore, due to the hash values of the digitally coded documents, it is not possible to draw conclusions as to the contents of the corresponding documents, thereby increasing the security. Lastly, a current version of the blockchain structure may be downloaded for example to a potable mobile telecommunications device via the network and may then be used for the checking of digitally coded documents even if there is no network connection available, i.e. the portable mobile telecommunications device is in an offline mode.

A "document" is understood in particular to mean a news item, a text, a deed, a certificate, or an identification, value or security document, in particular a sovereign document, in particular a paper-based and/or plastic-based document, for example an electronic identification document, in particular a passport, an identity card, visa, driver's license, vehicle registration certificate, vehicle title, health card, or a corporate identity card, or another ID document, a chip card, payment means, in particular bank note, bank card or credit card, consignment note or another proof of authorisation. In particular, the document may be a machine-readable travel document, as standardised for example by the international civil aviation authority (ICAO) and/or the BSI. A deed is an explanation in text or written form which affirms a certain fact or circumstance. In addition, the deed may identify the issuer of the deed.

A digitally coded document is understood to be a data construct for electronic data processing which comprises digitally coded data. In this case it may be, in particular, an electronic file of any file format, for example a text, table, sound, image and/or video file. In accordance with some embodiments the electronic file may be executable or non-executable. A digitally coded document may be, for example, a document which has been created or transferred into file form by digitalisation of a document having a physical document body, i.e. a conversion of the data comprised by the physical document body. In particular, the validity of such a document is independent of the presence of a fixedly assigned document body.

In accordance with some embodiments a digitally coded document may be created for example by producing a file comprising the data of the corresponding document on a computer. A virtual document may also be created for example by scanning or copying a physical document body, for example a document on paper.

In accordance with some embodiments the data to be stored comprise data of a transaction, wherein the provision of the data to be stored comprises a receipt of the data by means of a communications interface via a network from a computer system involved in the execution of the transaction, the method also comprising the steps of:
receiving a query for a current version of the blockchain structure by means of the communications interface via the network from a querying computer system;
sending the extended blockchain structure by means of the communications interface via the network to the querying computer system in response to the received query.

Some embodiments may have the advantage that transactions may be logged on the basis of the data entered in the blockchain structure. The transactions for example may be transactions of a cryptocurrency, a conventional currency, a sale, a dispatch, a transfer of ownership or a handover of an object and/or of a digitally coded document.

In accordance with some embodiments the data to be stored comprise status data of a device, wherein the provision of the data to be stored comprises a receipt of the data by means of a communications interface via a network from a computer system detecting the status data by means of a sensor, the method also comprising the steps of:
receiving a query for a current version of the blockchain structure by means of the communications interface via the network from a querying computer system;
sending the extended blockchain structure by means of the communications interface via the network to the querying computer system in response to the received query.

Some embodiments may have the advantage that the status and/or the status history of a device may be logged on the basis of the status data entered in the blockchain structure. Such a device may be, for example, a production device, a component of a computer system, a locking system, an access control device or a vehicle. A "vehicle" in this case is understood to be a mobile means of transport. Such a means of transport may be used, for example, for the transport of goods (traffic of goods), of tools (machines or auxiliaries) or people (passenger transport). Vehicles in particular also comprise motorised means of transport. For example, a vehicle may be a land vehicle, a watercraft and/or an aircraft. A land vehicle may be, for example: an automobile, such as a passenger car, a bus, or a lorry, a motor-operated two-wheeler, such as a motorbike, moped, motor scooter or motor-assisted bicycle, an agricultural tractor, fork-lift truck, golf buggy, or truck-mounted crane. In addition, a land vehicle may also be a rail-mounted vehicle. A watercraft may be, for example: a ship or boat. An aircraft may be, for example: an aeroplane or helicopter. A vehicle is also understood to be a motor vehicle.

A "sensor" is understood here to be an element for capturing measurement data. Measurement data are data which qualitatively or quantitatively reproduce physical or chemical properties of a measurement object, such as heat quantity, temperature, moisture, pressure, sound field dimensions, electromagnetic field strength, brightness, acceleration, position change, pH value, ion strength, electrochemical potential, and/or material composition thereof. Measurement data are detected by means of physical or chemical effects and are converted into an electrical signal suitable for further electronic processing. Measurement data, statuses and/or status changes of electronic devices or those resulting from use by a user may also be reproduced.

In accordance with some embodiments the status data may also comprise data regarding functions performed by the device. For example, manufacturing and/or processing procedures performed by a production device may thus also be logged. Furthermore, actions of an access control device for example may be logged, the logged data possibly comprising information regarding times when access has been granted to a secured region via the access control device, and to whom.

In accordance with some embodiments, the data to be stored comprise data which characterise a processing procedure of a digitally coded document, wherein the provision of the blockchain structure comprises a receipt of the document to be processed which the blockchain structure comprises and a reading of the blockchain structure from the received document, the provision of the data to be stored comprising a processing of the received document and a generation of the data, the storing of the extended blockchain structure comprising an addition of the extended blockchain structure to the processed document and a storage of the processed document with the extended blockchain structure.

Some embodiments may have the advantage that processing procedures of a digitally coded document may be logged on the basis of the data entered in the blockchain structure. For example, it may be logged when the document has been accessed and by whom, and whether any changed or which changes have been made to the document. For example, copying procedures of the document may also be logged, and the extended blockchain structure may be added to the created copy. The blockchain structure in this case comprises a history of origin of the created copy.

In accordance with some embodiments the method also comprises:
receiving a query for the processed document by means of a communications interface via a network from a querying computer system;
sending the processed document with the extended blockchain structure by means of the communications interface via the network to the querying computer system in response to the received query.

Some embodiments may have the advantage that the processing history and/or history of origin of the processed document may be reproduced and/or checked on the basis of the blockchain structure.

The document may be, in particular, a news item, for example in the form of a web page, a file linked to a website or integrated in a website, or a post. A website or web document, internet site or web page is understood to be a document provided via the Internet, which document is offered for example from a web server and may be called up using a browser of a user computer system with specification of a Uniform Resource Locator (URL). For example, it is an HTML document. A post is understood here to mean an individual contribution to an Internet platform, such as a social media platform, in a web forum or a blog.

Some embodiments comprise an electronic data storage system for tamper-proof storage of data in a bidirectionally linked blockchain structure, the data storage system comprising a processor and an electronic store with machine-readable instructions, an execution of the machine-readable instructions by the processor prompting the data storage system to execute a method comprising the steps of:

providing the bidirectionally linked blockchain structure;
providing the data to be stored;
providing a first family of functions, which comprises a plurality of functions, wherein the functions differ by at least one first parameter and are uniquely identifiable using the first parameter of each;
generating an additional block to extend the blockchain structure, which block comprises the data to be stored and is intended to be bidirectionally linked to the last block of the blockchain structure, the last block of the blockchain structure comprising stored data;
creating a first block-dependent bidirectional linking function for bidirectionally linking the last block to the additional block, the creation of the first linking function comprising the steps of:
calculating at least one first check value for the last and the additional blocks using the data stored in the last block and the data to be stored in the additional block;
selecting a first function from the first family of functions depending on the first check value in accordance with a first unique assignment condition between the first parameter of the selected first function and the first check value;
using the selected first function for creating the first block-dependent bidirectional linking function;
bidirectionally linking the last block to the additional block, the bidirectional linking comprising the steps of:
adding the first block-dependent bidirectional linking function to the last block;
adding the first block-dependent bidirectional linking function to the additional block;
storing the blockchain structure extended by the additional block.

In accordance with some embodiments the electronic data storage system is configured to execute one or more of the previously mentioned embodiments of the method for tamper-proof storage of data.

In accordance with some embodiments, the electronic data storage system comprises a file system. The file system provides a filing organisation on the data store. Data such as digitally coded documents may be stored as files on the data store. The files may also be read, changed or deleted.

In accordance with some embodiments, the electronic data storage system comprises a database. A database or a database system denotes a system for electronic data management. A database system makes it possible for large data volumes to be stored efficiently, consistently and permanently and for required partial volumes to be provided for users and application programs in different, tailored presentation forms. The database system for example comprises a database management system and a database in the narrower sense or data pool. The database management system provides a management software for managing data of the database. The management software internally organises the structured storage of data and controls all read and write access to the database. The database comprises the volume of data that are to be managed. Data such as digitally coded documents are in this case stored for example as part of the database.

The store may for example comprise a removable store, i.e. a non-fixedly installed, exchangeable and/or portable data carrier for a computer system. Removable stores for example include Blu-ray discs, CDs, floppy discs, DVDs, HD-DVDs, magnetic strips, MO/MODs, solid-state drives (SSDs), memory cards, USB sticks or removable hard drives.

Some embodiments comprise a telecommunications system which comprises an electronic data storage system according to one of the previously described embodiments and a communications interface for communication via a network, wherein the provision of the data to be stored comprises a receipt of the data by means of a communications interface via a network, the executed method also comprising the steps of:

receiving a query for a current version of the blockchain structure by means of the communications interface via the network from a querying telecommunications system;
sending the extended blockchain structure by means of the communications interface via the network to the querying telecommunications system in response to the received query.

The telecommunications system is for example a computer system which is configured for communication via a network.

A network may comprise, for example, a local network, in particular a Local Area Network (LAN), a private network, in particular an Intranet, or a Virtual Private Network (VPN). For example, the computer system may comprise a standard radio interface for connection to a WLAN. It may also be a public network, for example the Internet. For example, it may also be a digital cellular mobile communications network.

A "computer system" is understood here to be a device which processes data by means of programmable calculation rules using electronic circuits. A "program" or "program instructions" is understood here without limitation to mean any type of computer program which comprises machine-readable instructions for controlling a functionality of the computer.

A computer system may comprise an interface for connection to the network, the network possibly being a private or public network, in particular the Internet or another communications network. Depending on the embodiment, this connection may also be established via a mobile communications network.

A computer system may be, for example, a mobile telecommunications device, in particular a smartphone, a portable computer, for example a laptop or palmtop computer, a Personal Digital Assistant or the like. For example, it may also be a smartwatch or smartglasses. In addition, it may be a stationary computer system, for example a personal computer or a server incorporated in a client-server environment. In particular, it may be a server with a database management system which manages a database comprising data.

A "store" or "data store" is understood here to mean both a volatile and non-volatile electronic store or digital storage media.

A "non-volatile store" is understood here to mean an electronic store for permanent storage of data. A non-volatile store may be configured as an immutable memory, also referred to as a read-only memory (ROM), or as a changeable memory, also referred to as a non-volatile memory (NVM). In particular, in this case it may be an EEPROM, for example a flash EEPROM, referred to as a flash for short. A non-volatile store is characterised in that the data stored thereon are retained even once the power supply has been switched off.

Here, a "volatile electronic store" is a memory for storage predominantly of data which is characterised in that all data are lost once the power supply is switched off. In particular, it may be a volatile direct access memory, which is also referred to as a random-access memory (RAM), or a volatile main memory of the processor.

A "processor" is understood here and hereinafter to mean a logic circuit used to execute program instructions. The logic circuit may be implemented on one or more separate components, in particular on a chip. In particular, a "processor" is understood to mean a microprocessor or a microprocessor system formed of a number of processor cores and/or a number of microprocessors.

An "interface" or "communications interface" is understood here to mean an interface via which data may be received and sent, the communications interface being of wired or wireless configuration. The communications interface may be an internal interface or an external interface, which for example is connected to an associated device by means of a cable or wirelessly. A communications interface for wireless communication is understood to mean a communications interface which is configured for the contactless sending and receiving of data. The communication may be realised for example in accordance with an RFID and/or NFC standard, such as Bluetooth. The communications interface may also be configured for communication via a local radio network, for example in accordance with a standard from the IEEE-802.11 family and/or Wi-Fi.

An interface may be configured for example as a radio interface which enables communication via a digital cellular mobile radio network which may be constructed in accordance with a mobile radio standard, such as GSM, UMTS, LTE, COMA or another standard.

Communication may be realised generally for example via a network. A "network" is understood here to mean any transfer medium with a connection for communication which enables communication between at least two computer systems. A network may comprise, for example, a local network, in particular a Local Area Network (LAN), a private network, in particular an Intranet, or a Virtual Private Network (VPN). For example, the computer system may comprise a standard radio interface for connection to a WLAN. It may also be a public network, for example the Internet.

Some embodiments comprise a telecommunications system which comprises an electronic data storage system according to one of the previously described embodiments and a communications interface for communicating via a network, the data to be stored comprising data which characterise a processing procedure of a digitally coded document, wherein the provision of the blockchain structure comprises a receipt of the document to be processed which the blockchain structure comprises and a reading of the blockchain structure from the received document, the provision of the data to be stored comprising a processing of the received document and a generation of the data, the storing of the extended blockchain structure comprising an addition of the extended blockchain structure to the processed document and a storage of the processed document with the extended blockchain structure, the executed method also comprising the steps of:

receiving a query for the processed document by means of the communications interface via the network from a querying telecommunications system;

sending the processed document with the extended blockchain structure by means of the communications interface via the network to the querying telecommunications system in response to the received query.

In accordance with some embodiments the digitally coded document is sent following receipt of a request to send it. For example, the digitally coded document is an HTML document. For example, the digitally coded document is provided on an Internet platform, for example as a web page or as a post. A post is understood here to mean an individual contribution to an Internet platform, such as a social media platform, in a web forum or a bldg. The digitally coded document may also be provided for download. For example, a web page or a post comprises a link for calling up the digitally coded document.

Upon a corresponding request, for example in the form of a HTTP-GET request, the digitally coded document is sent to the requesting computer system.

In accordance with alternative embodiments the digitally coded document is sent regardless of a request to send it. For example, the document is sent in the form of an e-mail, an instant message, an audio message, a video message, a picture message, an SMS or an MMS or is comprised by one of the aforementioned message types. Instant messaging denotes a communications method in which two or more subscribers communicate with one another by digitally coded text, voice, picture and/or video messages. In this case, the sender triggers the transmission of the message, i.e. what is known as a push method is employed, such that the messages arrive as soon as possible at the intended receiver. The subscribers are connected in this case to a computer program via a network, such as the Internet, and are connected to one another directly or via a server.

Embodiments of the invention will be explained in greater detail hereinafter with reference to the drawings, in which.

Elements in the subsequent embodiments which correspond to one another are denoted by the same reference signs.

Figure 1:
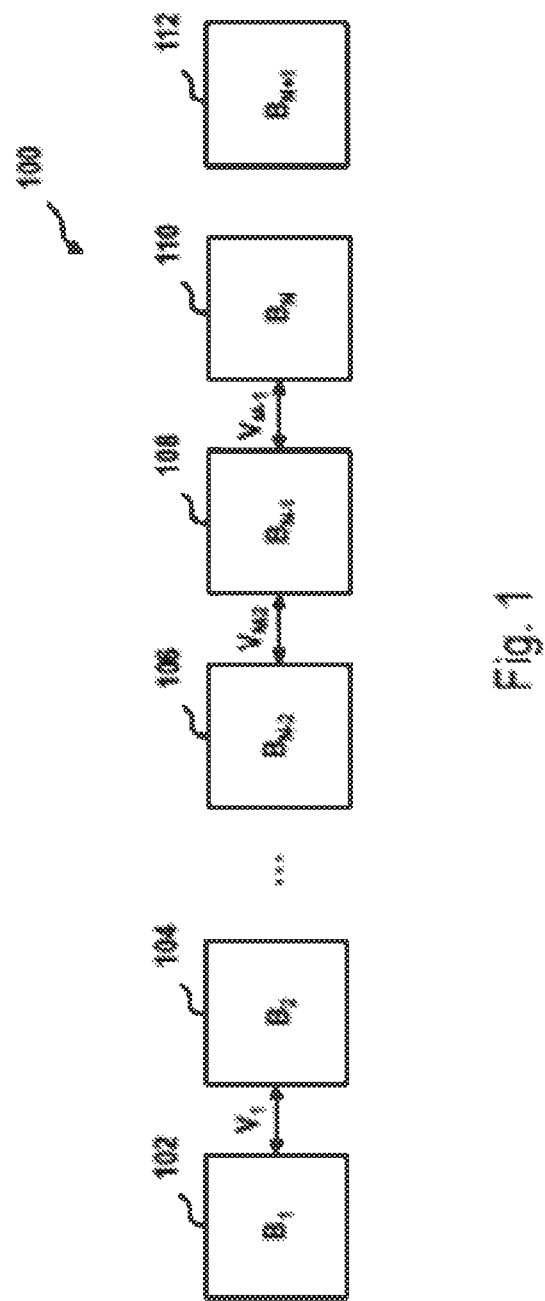
FIG. 1 shows a schematic block diagram of an embodiment of an exemplary blockchain structure.

FIG. 1 shows an embodiment of an exemplary blockchain structure 100 which comprises N blocks 102, 104, 106, 108, 110. The blockchain structure 100 is intended to extend an additional block 112. The blocks 102, 104, 106, 108, 110 of the blockchain structure 100 are linked to one another by block-dependent bidirectional linking functions. The individual bidirectional connections or linkages $V_1$, $V_{M-2}$, $V_{M-1}$ are indicated schematically by double-headed arrows. The inner blocks 104, 106, 108 of the blockchain structure 100 each comprise a common block-dependent linking function. A check value of each of the two blocks bidirectionally linked to one another may be incorporated as parameters in this common block-dependent linking function. Furthermore, a combined check value may be calculated from the check values and may be used to select the block-dependent linking function. Lastly, a function may be selected for each of the check values, which functions may be combined to form a common block-dependent linking function. The corresponding common block-dependent linking function is added to both blocks bidirectionally linked to one another.

The check value of the linking function for linking the last block 110 of the blockchain structure 100 in the additional block 112, i.e. for generating the bidirectional connection $V_{M}$, is dependent both on data that are stored in the last block 110 and on data that are stored in the additional block 112. The common linking function stored during the course of the bidirectional linking in the last block 110 and the additional block 112 thus constitutes a correct check function on the basis of correct check values of the two corresponding blocks only as long as the data of both blocks remain unchanged. In the event of a manipulation, for example of the additional block 112, the corresponding linking function of the connection between the last block 110 and the additional block 112 no longer matches the data of the additional block 112. A corresponding manipulation may be identified on the basis of this deviation.

Figure 2:
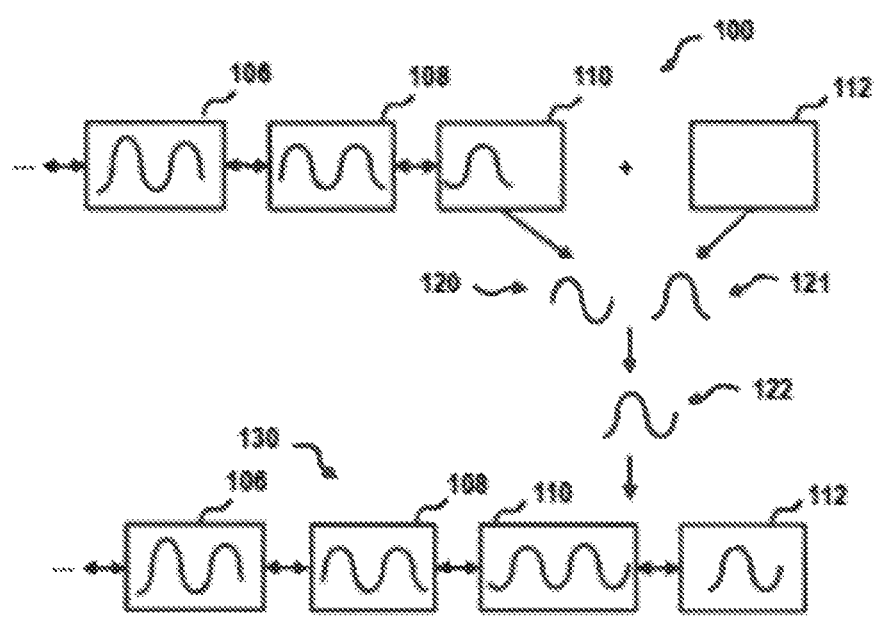
FIG. 2 shows a schematic flow diagram of an exemplary method for creating a bidirectional blockchain structure.

FIG. 2 shows a schematic block diagram of the method for extending the blockchain 100 from FIG. 1 by the block 112. The blocks 106, 108, 110 of the blockchain structure 100 each comprise a block-dependent linking function, these being indicated schematically by function curves. The blocks in the blockchain structure 100, for example the penultimate block 108 and the third-last block 106, each have a combination of two block-dependent bidirectional linking functions, which constitute a linking of the block-dependent bidirectional linking functions of the bidirectional connections to the previous block, for example block 106 in the case of block 108, and to the subsequent block, for example block 110 in the case of block 108. The corresponding block-dependent linking functions are integrated as mathematical functions into the corresponding blocks 106, 108. The various block-dependent linking functions were each created with use of the data of both blocks that are to be linked to one another.

For example, two functions 120, 121 are selected from two families of functions for the bidirectional linking of the last block 110 of the blockchain structure 100 to the additional block 112. A first function 120 is selected for example from a first family of functions depending on a check value of the data of the block 100 in accordance with a unique assignment condition between a parameter of the selected first function and the check value of the block 110. The second function 121 is selected for example from a second family of functions depending on a check value of the data of the additional block 112 in accordance with a unique assignment condition between a parameter of the selected second function and the check value of the block 112. The two functions 120, 121 are combined to form a common block-dependent linking function 122. A corresponding combination may be, for example, an arithmetic operation, for example an addition, subtraction, multiplication and/or division. The block-dependent bidirectional linking function 122 is added both to the block 110 and to the block 112 for bidirectional linking of the block 110 to the block 112. In this case, the linking function 122 is linked to the linking function, already provided in the block 110, of the bidirectional linking between block 108 and block 110.

In accordance with alternative embodiments the two check values of the two blocks 110, 112 to be linked bidirectionally are combined to form a combined check value, and the block-independent bidirectional linking function 122 is selected as function from a family of functions depending on the combined check value of the two blocks 110, 112 in accordance with a unique assignment condition between a parameter of the selected function, i.e. of the block-dependent bidirectional linking function 122, and the combined check value of the blocks 110, 112, In accordance with a further alternative, the functions of the family of functions comprise a multitude of n parameters, for example n=2, and are uniquely identifiable using the various n parameters which form an n-tuple of parameters. In this case, an n-tuple of check values is formed from the two check values of the blocks 110, 112 and a function 122 of the family of functions is selected depending on the n-tuple of check values in accordance with a unique assignment condition between the n-tuple of parameters of the selected function and the n-tuple of check values.

Figure 3:
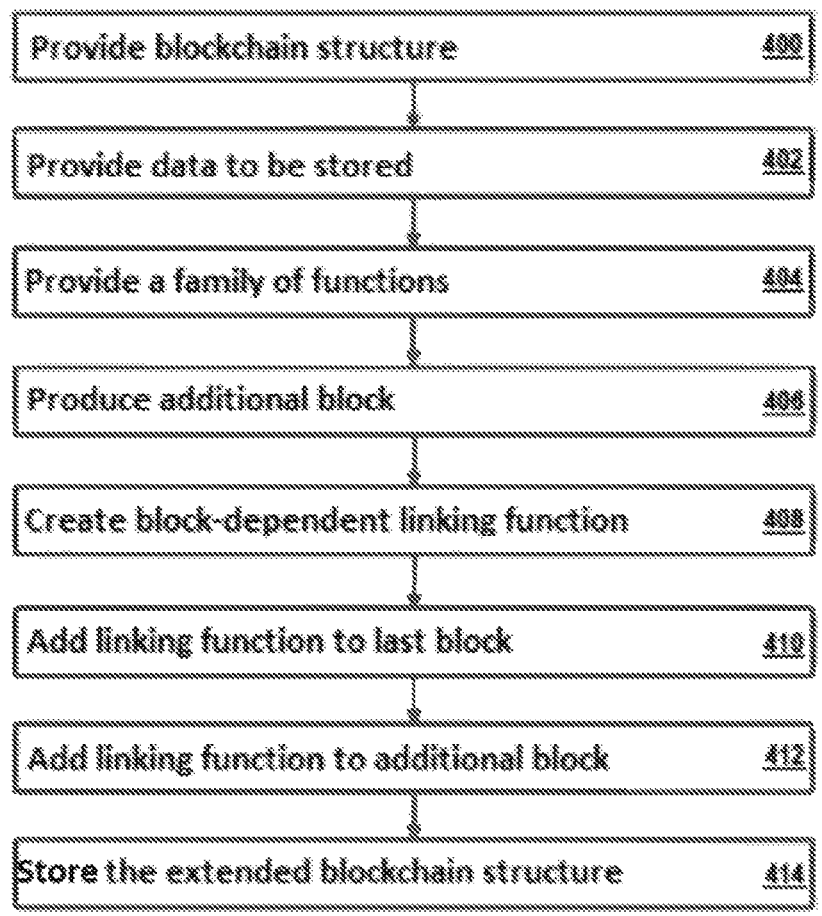
FIG. 3 shows a schematic flow diagram of an exemplary method for creating a bidirectional blockchain structure.

FIG. 3 shows an embodiment of an exemplary method for extending a bidirectionally linked blockchain structure by an additional block. In step 400 a bidirectionally linked blockchain structure is provided. In step 402 the data to be stored are provided. In block 404 a family of functions is provided. The family of functions comprises a plurality of functions, wherein the functions differ by at least one first parameter and are uniquely identifiable using the first parameter of each. In block 406 an additional block is produced in order to extend the blockchain structure. The additional block comprises the data to be stored and is intended to be linked bidirectionally to the last block of the blockchain structure. In step 408 a block-dependent linking function is selected for the bidirectional linking of the last block of the blockchain structure to the additional block using the family of functions. To this end, for example, a combined block-dependent check value is calculated, which is dependent both on the data of the last block of the blockchain structure and on the data of the additional block to be added. For example, an individual check value is calculated for each of the blocks and the two resultant check values are combined with one another. In accordance with further embodiments the functions of the family of functions provided in block 404 comprise n-tuples of parameters and one n-tuple of check values is created from the two check values of the blocks to be linked bidirectionally to one another. The function of the family of functions is selected depending on the n-tuple of check values in accordance with a unique assignment condition between the n-tuple of parameters of the selected first function and the n-tuple of check values. In accordance with a further alternative, two families of functions are provided in block 404. In block 408 a first function is then selected from the first of the two families of functions using a first check value of a first of the two blocks to be linked bidirectionally to one another. Furthermore, a second function is selected from the second of the two families of functions using the second check value of the second of the two blocks to be linked bidirectionally to one another. The two resultant functions are combined to form a common block-dependent bidirectional linking function. In step 410 the block-dependent bidirectional linking function created in step 408 is added to the last block of the blockchain structure. In step 412 the block-dependent bidirectional linking function is added to the additional block. In accordance with some embodiments, step 410 comprises a linking of the block-dependent bidirectional linking function created in step 408 with the block-dependent bidirectional linking function, already provided in the last block of the blockchain structure, of the bidirectional linkage between the last block and the penultimate block of the blockchain structure. For example, the corresponding linkage may be an arithmetic operation. For example, the two linking functions may be added to one another or multiplied by one another.

Figure 4:
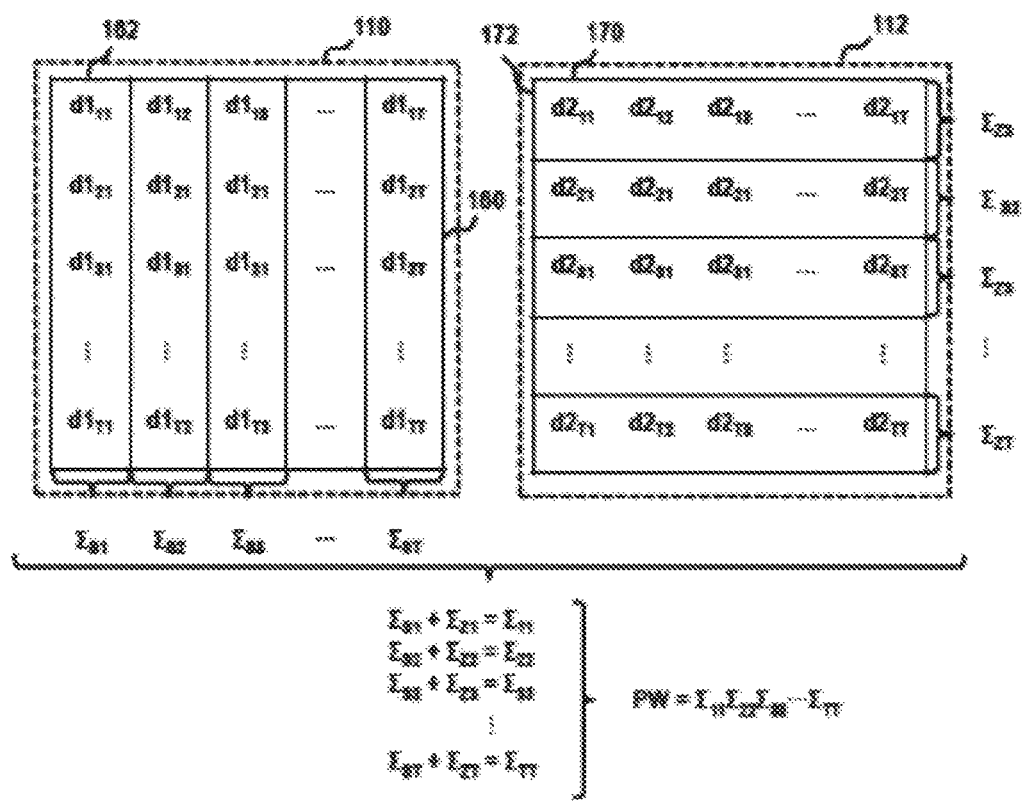
FIG. 4 shows a schematic block diagram of an exemplary method for creating a combined block-dependent check value.

FIG. 4 shows a schematic block diagram of a calculation of the check value of two blocks 110, 112 to be linked to one another, as comprised for example by step 406 in FIG. 3. The data of the two blocks 110, 112 to be linked to one another are stored for example in each case in a square (T×T) matrix structure 160, 170. T is, for example, a natural number T≥2. If the matrix structures 160, 170 of the two blocks 110, 112 have different dimensions, one or both matrix structures 160, 170 are extended in such a way that two square matrix structures of equal size result. To this end, additional matrix elements or additional rows and/or column are added, for example. The added matrix elements each comprise a placeholder, for example the value 0. For example, if the matrix structure of the block 110 has a column less, i.e. for example the T-th column is missing, this is thus supplemented, with all elements of the T-th column $D1_{1T}$ to $D1_{TT}$ being set to 0. In order to calculate the combined block-dependent check value PW, for example the sum of all elements of the corresponding column 162 are calculated for each column 162 of the matrix structure 160 of the block 110. For the i-th column, the sum in this case is given by $\Sigma_{Si} = \Sigma_{j=1}^{T} d1_{ji}$. In addition, for each of the rows 172 of the matrix structure 170 of the block 112, the sum of all elements of the particular row 172 is calculated. For the i-th row, the sum in this case is given by $\Sigma_{Zi} = \Sigma_{j=1}^{T} d2_{ij}$. In a next step, the sum $\Sigma_{Si}$ calculated for the i-th column of the matrix structure 160 of the block 110 is added to the sum $\Sigma_{Zi}$ of the i-th row of the matrix structure 170 of the block 112. The resultant T sums $\Sigma_{11}$ to $\Sigma_{TT}$ are concatenated, such that a number sequence results which forms the combined block-dependent check value: $PW = \Sigma_{11}\Sigma_{22} \ldots \Sigma_{T-1T-1}\Sigma_{TT}$. In accordance with alternative embodiments, the sums over the rows of the matrix structure 160 and the sums over the columns of the matrix structure 170 could also be formed in order to calculate the combined check value.

Figure 5:
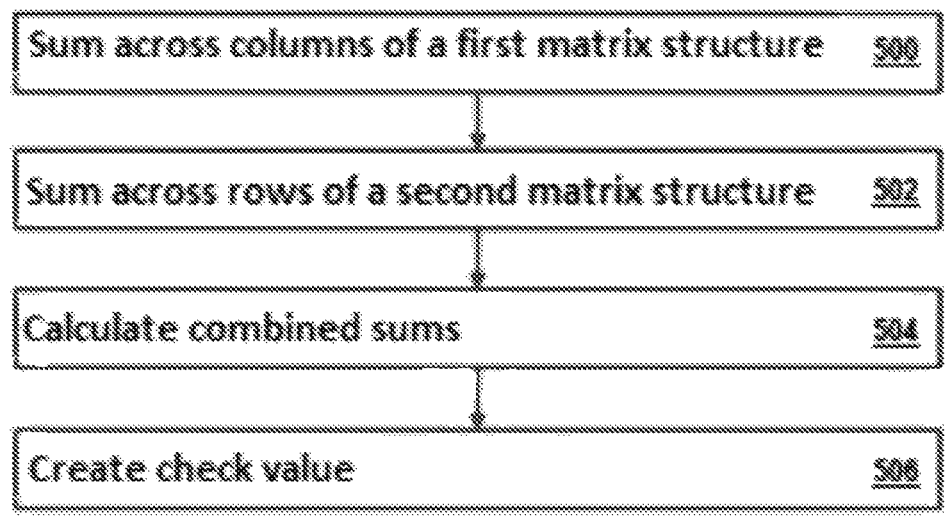
FIG. 5 shows a schematic flow diagram of an exemplary method for creating a combined block-dependent check value.

FIG. 5 shows an exemplary method for calculating a combined block-dependent check value according to FIG. 4. In step 500 a sum of all elements of the corresponding column is calculated for each column of a matrix structure of a first block. In step 502 a sum of all elements of the corresponding row is calculated for each row of a matrix structure of a second block which is to be linked bidirectionally to the first block. In step 504 each column of the matrix of the first block is assigned a row of the matrix of the second block. For example, the i-th column is assigned to the i-th row. For each of the resultant pairs from the corresponding i-th column of the matrix structure of the first block and the i-th row of the matrix structure of the second block, a combined sum is calculated. In step 506 the sums calculated in step 504 are concatenated in a number sequence, such that they form a combined block-dependent check value.

Figure 6:
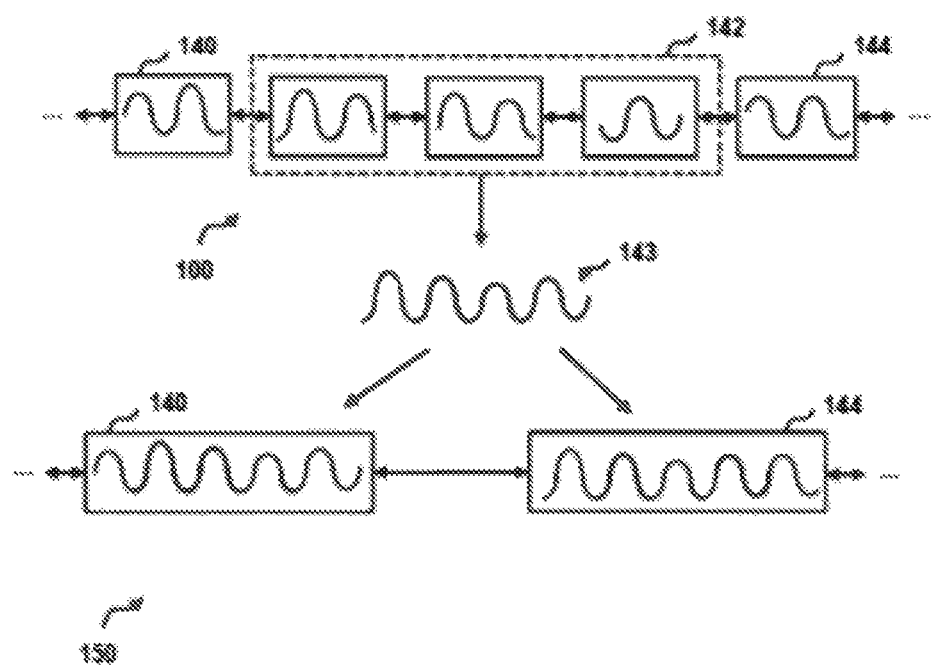
FIG. 6 shows a schematic flow diagram of an exemplary method for creating a shortened bidirectional blockchain structure.

FIG. 6 shows an exemplary bidirectionally linked blockchain structure 100 which is to be shortened so that a shortened blockchain structure 150 results. To do this, an inner chain segment 142 between the blocks 140 and 144 is removed. The removed inner chain segment 142 may comprise security-critical data, for example. For example, the inner chain segment 142 comprises a multitude of successive blocks of the blockchain structure 100. Once the chain segment 142 has been removed, the two remaining blocks 140 and 144 form direct neighbour blocks of the shortened blockchain structure 150. These two blocks 140, 144 are linked to a combined bidirectional linking function 143, which comprises a combination of all block-dependent bidirectional linking functions of the blocks of the removed inner chain segment 142. For example, the individual bidirectional linking functions of the inner chain segment 142 are linked to one another by an arithmetic linkage, which for example comprises an addition, subtraction, multiplication and/or division. The two blocks 140 and 144 which initially form loose ends of the blockchain structure 150 following the removal of the inner chain segment 142 are thus linked to one another bidirectionally. For example, the linking functions of the blocks 140, 144 are extended in such a way that they comprise the combined bidirectional linking function 143 fully.

In this case, the resultant blockchain structure 150 is in particular still dependent on the removed inner chain segment 142. If the removed inner chain segment 142 is provided to supplement the shortened blockchain structure 150, it is thus possible to check, by use of the extended bidirectional linking functions of the blocks 140, 144, which comprise combined bidirectional linking functions 143, whether the provided inner chain segment is authentic. If the provided inner chain segment is authentic, i.e. identical with the removed chain segment 142, the shortened blockchain structure may thus be supplemented to the original complete blockchain structure 100. For example, blocks comprising security-critical data which were removed previously for protection of the security-critical data may be supplemented in this way.

Figure 7:
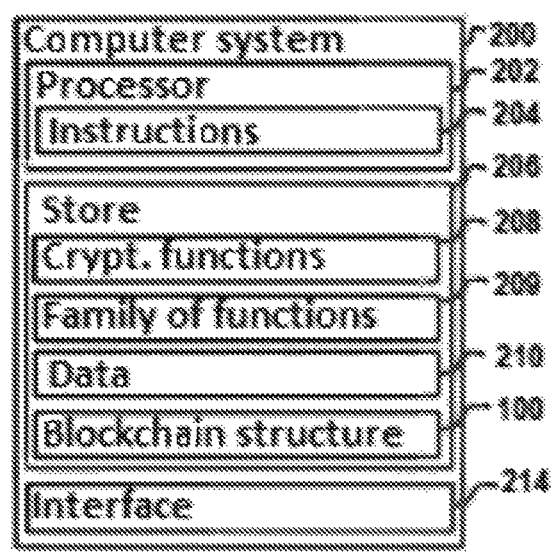
FIG. 7 shows a schematic block diagram of an embodiment of an exemplary data storage system.

FIG. 7 shows a schematic block diagram of an embodiment of an exemplary data storage system 200 in the form of a computer system for tamper-proof storage of data 210 in an electronic store 206 with use of a bidirectionally linked blockchain structure 100.

The computer system 200 comprises a processor 202, which is configured to execute program instructions 204. By execution of the program instructions 204, the processor 202 controls the computer system 200 such that it executes one of the previously described embodiments of the method for the tamper-proof storage of data.

The computer system 200 also comprises a store 206, in which cryptographic functions 208 for calculating block-dependent check values and one or more families of functions 209 for selecting one or more functions for the creation of block-dependent bidirectional linking functions are stored. The store 206 additionally comprises data 210 which are to be protected against manipulations or which are to be stored in tamper-proof fashion using a bidirectionally linked blockchain structure 100. For example, the computer system 200 executes one of the methods according to FIGS. 2 and 3 and produces an additional block for the blockchain structure 100, which block comprises the data 210 to be stored in tamper-proof fashion and is linked bidirectionally to the last block of the blockchain structure 100. For the bidirectional linking of the additional block, for example check values are calculated using the functions 208, which are dependent both on the data 210 and on data from the blockchain structure 100. A block-dependent bidirectional linking function is created using these check values and the family of functions 209.

Lastly, the computer system 200 comprises a communications interface 214. This communications interface 214 for example may be a network interface for communication via a network or an interface for communication with a removable storage device. For example, the data 210 and/or the blockchain structure 100 may be provided via the communications interface 214. Furthermore, the communications interface 214 may be a user interface for inputting commands by a user and/or for outputting results.

In accordance with some embodiments, the program instructions 204 for example comprise a database management system which manages blockchain structures, such as the blockchain structure 100, stored in the store 206.

Figure 8:
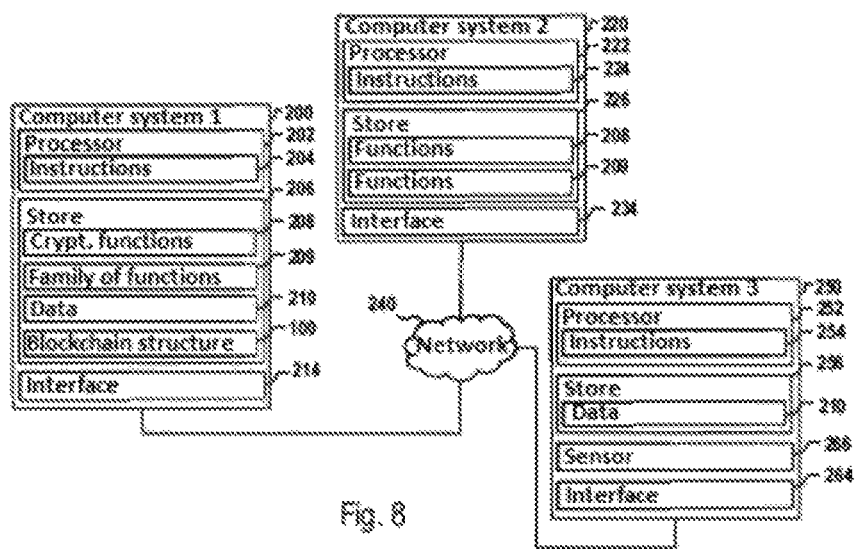
FIG. 8 shows a schematic block diagram of an embodiment of an exemplary telecommunications system.

FIG. 8 shows the exemplary data storage system 200 from FIG. 7 which is configured as a telecommunications system which may communicate by means of the communications interface 214 via the network 240 with other computer systems, such as the computer systems 220, 250. For example, the data 210 are provided from the computer system 250 via the network 240.

The computer system 250 for example comprises a store 256 for storage of the data 210 which are to be protected by the computer system 200 against manipulations. In accordance with some embodiments the data 210 are data which are characterising for a digitally coded document. For example, the data 210 are data which constituted by a hash value of the content of a digitally coded document. In accordance with further embodiments, the data 210 are transaction data of a transaction initiated, logged and/or executed by the computer system 250. In accordance with further embodiments, the data 210 are sensor data which were detected by means of a sensor 266 of the computer system 250. The computer system 250 further comprises a processor 252, which is configured to execute program instructions 254. In accordance with embodiments, the computer system 250 is likewise configured as a telecommunications system which may communicate with the computer system 200 by means of the communications interface 264 via the network 240. An execution of the program instructions 254 by the processor 252 prompts the computer system 250 for example to send the data 210 to the computer system 200. The sending of the data 210 via the network 240 may be initiated for example in response to a query by the computer system 200 or an initiative by the computer system 250 itself.

FIG. 8 additionally shows the computer system 220, which is likewise configured as a telecommunications system and may communicate with the computer system 200 by means of the communications interface 264 via the network 240. The computer system 220 for example comprises a processor 222 with program instructions 224. The processor 222 is configured to execute the program instructions 224, and an execution of the program instructions 224 by the processor 222 prompts the computer system 220 to query the blockchain structure 100, extended by the data 210, from the computer system 200 via the network. In response to a corresponding query, the computer system 220 for example receives the blockchain structure 100. In accordance with some embodiments, the computer system 220 may read the data stored in the blockchain structure 100. The integrity of the read data may be checked by the computer system 220 for example using the cryptographic functions 208 stored in the memory 226 and the family or families of functions 209. The block-dependent bidirectional linking functions of the blockchain structure 100 which link the blocks of the blockchain structure 100 to one another bidirectionally may be recalculated and checked for consistency and/or integrity using the cryptographic functions 208 and the family of functions 209. The read data are, for example, data for proving the authenticity of a digitally coded document. The corresponding document is made available to the computer system 220 for example from the computer system 250 via the network 240. If the read data for example are constituted by a hash value of the content of the document, the authenticity of the provided document may thus be checked on the basis of these data. For example, a hash value is calculated for the document by the computer system 220. If the calculated hash value matches the read data, the provided document is accepted as authentic.

The blockchain structure 100 received by the computer system 220 may be used in particular also for checks in offline mode, i.e. if the network 240 is temporarily unavailable. Thus, data which are to be checked in respect of their authenticity with the aid of the blockchain structure 100 may be directly received or read for example by the computer system 220 without a network 240. These data may then be checked in respect of their authenticity with use of the blockchain structure 100.

LIST OF REFERENCE SIGNS 100 blockchain structure
102 first block
104 second block
106 third-last block
108 penultimate block
110 last block
112 additional block
120 function
121 function
122 bidirectional linking function
130 extended blockchain structure
140 block
142 inner chain segment
143 combined bidirectional linking function
144 block
150 shortened blockchain structure
160 matrix structure
162 column
170 matrix structure
172 row
200 computer system
202 processor
204 program instructions
206 store
208 cryptographic functions
209 family of functions
210 data
214 communications interface
220 computer system
222 processor
224 program instructions
226 store
234 communications interface
240 network
250 computer system
252 processor
254 program instructions
256 store
264 communications interface
266 sensor

The invention claimed is:

1. A method for the tamper-proof storage of data in an electronic store using a bidirectionally linked blockchain structure comprising:
providing the bidirectionally linked blockchain structure;

providing the data to be stored;
providing a first family of functions comprising a first plurality of functions, wherein the functions differ by at least one first parameter and are uniquely identifiable using the first parameter of each;
generating an additional block to extend the bidirectionally linked blockchain structure, wherein the additional block comprises the data to be stored and is intended to be bidirectionally linked to a last block of the bidirectionally linked blockchain structure, the last block of the blockchain structure comprising stored data;
creating a first block-dependent bidirectional linking function for bidirectionally linking the last block to the additional block, the creation of the first block-dependent bidirectional linking function comprising:
calculating at least one first check value for the last block and the additional blocks using the data stored in the last block and the data to be stored in the additional block;
selecting a first function from the first family of functions depending on the first check value in accordance with a first unique assignment condition between the first parameter of the first function and the first check value; and
using the selected first function to create the first block-dependent bidirectional linking function;
bidirectionally linking the last block to the additional block, the bidirectional linking comprising:
adding the first block-dependent bidirectional linking function to the last block; and
adding the first block-dependent bidirectional linking function to the additional block; and
storing the blockchain structure extended by the additional block.

2. The method according to claim 1, wherein the use of the first function to create the first block-dependent bidirectional linking function comprises a use of the selected function as the first block-dependent bidirectional linking function.

3. The method according to claim 1, wherein the first check value is a combined check value which is dependent both on the data stored in the last block and on the data to be stored in the additional block.

4. The method according to claim 3, wherein data are stored in the blocks of the bidirectionally linked blockchain structure in a square (TxT) matrix structure, where T is a natural number greater than or equal to two and the calculation of the first check value comprises:
calculating a sum over each column of a first matrix structure which is provided by the two matrix structures of the data stored in the last block and the data to be stored in the additional block;
calculating a sum over each column of a second matrix structure which is provided by the two matrix structures of the data stored in the last block and the data to be stored in the additional block;
calculating the combined sum from the sum of the i-th column and the sum of the i-th row, where i is a natural number and runs from 1 to T; and
forming the first block-dependent check value by linking the combined sums to one another.

5. The method according to claim 1, wherein the functions of the first family of functions differ by a multiplicity of n parameters and are uniquely identifiable using the corresponding n parameters, which form an n-tuple of parameters, the n-tuple of parameters each comprising the first parameter, and wherein the creation of the first block-dependent bidirectional linking function also comprising:
calculating an n-tuple of check values for the last block and the additional blocks using the data stored in the last block and the data to be stored in the additional block, the n-tuple comprising the first check value; and
selecting the first function of the first family of functions depending on the n-tuple of check values in accordance with a first unique assignment condition between the n-tuple of parameters of the first function and the n-tuple of check values.

6. The method according to claim 1, wherein the method further comprises:
providing a second family of functions comprising a second plurality of functions, wherein the functions differ by at least one second parameter and are uniquely identifiable using the second parameter of each; and
wherein:
the creation of the first block-dependent bidirectional linking function further comprises:
calculating a second check value using the data to be stored in the additional block, the second check value being calculated using the data stored in the last block;
selecting a second function from the second family of functions depending on the second check value in accordance with a second unique assignment condition between the second parameter of the selected second function and the second check value; and
using the selected second function to create the first block-dependent bidirectional linking function, the first block-dependent bidirectional linking function comprising a unique combination of the first function and the second function.

7. The method according to claim 6, wherein the first unique assignment condition and/or the second unique assignment condition each comprise a linear function.

8. The method according to claim 6, wherein the functions of the first family of functions and/or the functions of the second family of functions each comprise at least one of (i) a polynomial, at least one of the first parameter and/or the second parameter being the degree of the polynomial, (ii) a spherical harmonic, at least one of the first parameter and the second parameter being an index of the spherical harmonic, and (iii) a Gaussian function and, at least one of the first parameter and the second parameter being the width of the Gaussian functions.

9. The method according to claim 1, wherein the last block of the bidirectionally linked blockchain structure also comprises a second block-dependent bidirectional linking function of the bidirectional linking of the last block to a penultimate block of the bidirectionally linked blockchain structure, and
wherein the addition of the first block-dependent bidirectional linking function to the last block comprises a linking of the first linking function to the second linking function.

10. The method according to claim 1, wherein successive blocks of the bidirectionally linked blockchain structure are each linked bidirectionally to one another, and two blocks bidirectionally linked to one another each comprise a common block-dependent bidirectional linking function, the common block-dependent bidirectional linking function being dependent in each case on the data stored in the two blocks bidirectionally linked to one another.

11. The method according to claim 1, wherein the method also comprises creating a shortened blockchain structure of the bidirectionally linked blockchain structure, the shortened blockchain structure being shorter than the bidirectionally linked blockchain structure by at least one inner chain segment, the inner chain segment comprising at least one block, with two remaining direct neighbour blocks of the shortened blockchain structure, between which the inner chain segment was removed, being linked to a combined bidirectional linking function which comprises a combination of all block-dependent bidirectional linking functions of the blocks of the removed inner chain segment.

12. The method according to claim 11, wherein the removed inner chain segment comprises a plurality of blocks of the bidirectionally linked blockchain structure.

13. The method according to claim 11, wherein the method further comprises:
   providing the removed inner chain segmenter; and
   checking the authenticity and/or completeness of the inner chain segment, the check comprising a comparison of the combined bidirectional linking function of the two remaining direct neighbour blocks of the shortened blockchain structure with a combination of all block-dependent bidirectional linking functions of the blocks of the provided inner chain segment.

14. The method according to claim 13, wherein, in the event of a successful checking of the authenticity and/or completeness of the provided inner chain segment, the shortened blockchain structure is supplemented by the provided inner chain segment, and the combined bidirectional linking function between the two remaining direct neighbour blocks of the shortened blockchain structure is replaced by the original block-dependent bidirectional linking functions of the two blocks neighbouring the removed inner chain segmenter.

15. The method according to claim 1, wherein the data to be stored comprise data which are characterising for content of a digitally coded document, the provision of the data to be stored comprising a receipt of the data by means of a communications interface via a network from a computer system creating the digitally coded document, the method also comprising:
   receiving a query for a current version of the bidirectionally linked blockchain structure by means of the communications interface via the network from a querying computer system; and
   sending the extended blockchain structure by means of the communications interface via the network to the querying computer system in response to the received query.

16. The method according to claim 1, wherein the data to be stored comprise data of a transaction, the provision of the data to be stored comprising a receipt of the data by means of a communications interface via a network from a computer system involved in the execution of the transaction, the method also comprising:
   receiving a query for a current version of the bidirectionally linked blockchain structure by means of the communications interface via the network from a querying computer system; and
   sending the extended blockchain structure by means of the communications interface via the network to the querying computer system in response to the received query.

17. The method according to claim 1, wherein the data to be stored comprise status data of a device, the provision of the data to be stored comprising a receipt of the data by means of a communications interface a network from a computer system detecting the status data by means of a sensor, the method also comprising:
   receiving a query for a current version of the bidirectionally linked blockchain structure by means of the communications interface via the network from a querying computer system; and
   sending the extended blockchain structure by means of the communications interface via the network to the querying computer system in response to the received query.

18. The method according to claim 1, wherein the data to be stored comprise data which characterise a processing procedure of a digitally coded document, the provision of the bidirectionally linked blockchain structure comprising a receipt of the document to be processed which the bidirectionally linked blockchain structure comprises and a reading of the bidirectionally linked blockchain structure from the document, the provision of the data to be stored comprising a processing of the document and a generation of the data, the storing of the extended blockchain structure comprising an addition of the extended blockchain structure to the processed document and a storage of the processed document with the extended blockchain structure.

19. The method according to claim 18, wherein the method also comprises:
   receiving a query for the processed document by means of a communications interface via a network from a querying computer system;
   sending the processed document with the extended blockchain structure by means of the communications interface via the network to the querying computer system in response to the received query.

20. An electronic data storage system for tamper-proof storage of data in a bidirectionally linked blockchain structure, the data storage system comprising a processor and an electronic store with machine-readable instructions, an execution of the machine-readable instructions by the processor prompting the data storage system to:
   provide the bidirectionally linked blockchain structure;
   provide the data to be stored;
   provide a first family of functions comprising a first plurality of functions, wherein the functions differ by at least one first parameter and are uniquely identifiable using the first parameter of each;
   generate an additional block to extend the bidirectionally linked blockchain structure, wherein the additional block comprises the data to be stored and is intended to be bidirectionally linked to the last block of the bidirectionally linked blockchain structure, the last block of the bidirectionally linked blockchain structure comprising stored data;
   create a first block-dependent bidirectional linking function for bidirectionally linking the last block to the additional block, the creation of the first linking function comprising:
   calculating at least one first check value for the last block and the additional blocks using the data stored in the last block and the data to be stored in the additional block;
   selecting a first function from the first family of functions depending on the first check value in accordance with a first unique assignment condition between the first parameter of the selected first function and the first check value; and
   using the first function to create the first block-dependent bidirectional linking function; and
   bidirectionally linking the last block to the additional block, the bidirectional linking comprising:

adding the first block-dependent bidirectional linking function the last block;

adding the first block-dependent bidirectional linking function to the additional block; and storing the bidirectionally linked blockchain structure extended by the additional block.

\* \* \* \* \*